United States Patent
Eadara et al.

(10) Patent No.: US 6,861,464 B2
(45) Date of Patent: Mar. 1, 2005

(54) TWO COMPONENT, CURABLE, HOT MELT ADHESIVE

(75) Inventors: Rajan Eadara, Ann Arbor, MI (US); Mooil Chung, Troy, MI (US); David Wen-Lung Chang, Troy, MI (US); Sunny K. George, Sterling Heights, MI (US); Patrick A. Ohaka, Southfield, MI (US); Joribeth E. Joseff, Mount Pleasant, SC (US); Yushin Ahn, Farmington Hills, MI (US)

(73) Assignee: Diversified Chemical Technologies, Inc., Detroit, MI (US)

( * ) Notice: Subject to any disclaimer, the term of this patent is extended or adjusted under 35 U.S.C. 154(b) by 301 days.

(21) Appl. No.: 10/199,379

(22) Filed: Jul. 19, 2002

(65) Prior Publication Data

US 2004/0014866 A1 Jan. 22, 2004

(51) Int. Cl.$^7$ ............................................... C08L 31/04
(52) U.S. Cl. ...................... 524/502; 524/563; 524/500; 524/514; 524/507; 524/270; 524/277
(58) Field of Search ................................ 524/563, 500, 524/514, 507, 270, 277, 502

(56) References Cited

U.S. PATENT DOCUMENTS

| | | | |
|---|---|---|---|
| 4,404,299 A | 9/1983 | Decroix | 524/77 |
| 4,425,389 A | 1/1984 | Schollhorn et al. | 428/34 |
| 4,500,604 A | 2/1985 | Herold et al. | 428/414 |
| 4,532,273 A | 7/1985 | Kadowaki et al. | 523/402 |
| 4,548,992 A | 10/1985 | Doi et al. | 525/167 |
| 4,728,737 A | 3/1988 | Goel | 544/400 |
| 4,775,719 A | 10/1988 | Markevka et al. | 525/125 |
| 5,441,999 A * | 8/1995 | Jarvis et al. | 524/271 |
| 5,672,652 A | 9/1997 | Bhat | 524/590 |
| 5,827,393 A | 10/1998 | Kinzelmann et al. | 156/308.2 |
| 5,849,832 A | 12/1998 | Virnelson et al. | 524/512 |
| 5,852,103 A | 12/1998 | Bhat | 524/590 |
| 5,952,071 A * | 9/1999 | Rijsdijk et al. | 428/58 |
| 5,977,242 A | 11/1999 | Origuchi et al. | 524/521 |
| 6,090,881 A | 7/2000 | Das et al. | 524/555 |
| 6,121,354 A | 9/2000 | Chronister | 524/262 |
| 6,218,471 B1 * | 4/2001 | Chenard et al. | 525/123 |
| 6,274,674 B1 | 8/2001 | Chang et al. | 524/129 |
| 6,294,597 B1 | 9/2001 | Rinde et al. | 523/442 |
| 2003/0041963 A1 | 3/2003 | Gong et al. | 156/272.2 |

FOREIGN PATENT DOCUMENTS

| | | |
|---|---|---|
| EP | 0 527 706 A1 | 2/1993 |
| EP | 0 821 717 B1 | 7/1999 |
| WO | WO 02/31077 A2 | 4/2002 |

\* cited by examiner

*Primary Examiner*—David W. Wu
*Assistant Examiner*—Satya B Sastri
(74) *Attorney, Agent, or Firm*—Gifford, Krass, Groh, Sprinkle, Anderson & Citkowski, P.C.

(57) ABSTRACT

A two component, curable hot melt adhesive system includes a first hot melt adhesive formulation which has a softening temperature greater than room temperature and which includes a first component of a curable adhesive therein. The system includes a second hot melt adhesive formulation which has a softening temperature which is greater than room temperature and which includes a second component of a curable adhesive therein. The second component is reactive with the first component to provide a cured adhesive bond. In use, the two formulations are heated to a temperature above their softening temperature and are contacted so as to cause mixing. The mixture cools to provide a thermoplastic bond which subsequently cures to provide a permanent adhesive bond. While the first and the second component individually perform as hot melt adhesives, combining the first and the second gives enhanced adhesive performance in extended temperature ranges.

25 Claims, No Drawings

TWO COMPONENT, CURABLE, HOT MELT ADHESIVE

FIELD OF THE INVENTION

This invention relates generally to adhesives. More specifically, the invention relates to hot melt adhesives. Most specifically, the invention relates to a two part, hot melt based, curable adhesive.

BACKGROUND OF THE INVENTION

Packaging hot melt adhesives generally comprise thermoplastic compositions, typically fabricated from a mixture of polymeric resins, tackifier resins and waxes. Hot melt adhesive compositions are relatively solid and non-tacky at room temperature; however, when raised to an elevated temperature they soften and melt so as to provide a tacky, relatively fluid material. Hot melt adhesive formulations have what is termed an "open time" which is the period of time during which the heated composition remains fluid enough to allow for the effectuation of an adhesive bond. In use, hot melt adhesives are raised to a working temperature, and applied to articles to be joined. The articles are maintained in contact during the open time of the adhesive. Upon cooling, the hot melt adhesive reverts to its solid form and provides an adhesive bond between articles which it joins. Since the hot melt adhesive is a thermoplastic material, the bond can be broken by reheating the adhesive back to a temperature above its softening temperature.

Hot melt adhesives are in very widespread use; and one particular application for hot melt adhesives is for the sealing of packages, particularly corrugated and paper board packages used for consumer and industrial goods. Hot melt adhesive materials may be pre-applied to various of the closure portions of packages at the time they are fabricated. This avoids the expense and labor associated with maintaining adhesive application equipment at package filling facilities. The non-tacky and non-blocking nature of the hot melt adhesives at room temperature allows for such uses. After a package is filled, a simple heat sealing step is employed to close the package.

While hot melt adhesive techniques are in widespread use, there are problems associated therewith, and these problems are inherent to the nature of hot melt adhesives. Since the bond formed by hot melt adhesives is thermoplastic, temperature extremes encountered during shipping, storage and use can cause failure of the adhesive bond. For example, goods are often shipped by truck and/or stored in uninsulated warehouses, and can be subjected to very high ambient temperatures, and these temperatures can be sufficient to soften hot melt adhesive formulations to a degree sufficient to result in bond failure. While it is possible to raise the softening point of hot melt adhesives by varying the formulation, doing so engenders other problems, since the packages are also exposed to very low temperature conditions during shipping and storage, particularly if those packages are used for foods which must be kept cool. Low temperatures can embrittle the adhesive bond leading to mechanical failure. Problems of low temperature failure can be accommodated by softening the hot melt formulations so that they will be less brittle; however, this results in a loss of high temperature strength and also tends to make the adhesive formulations tacky at ambient temperatures. Such tackiness can cause premature adhesive bonding, and may cause packages to stick together during filling, shipping and handling; this phenomenon is called "blocking."

Accordingly, there is a need for adhesive formulations which retain the advantages of conventional hot melt adhesives, but provide a bond which is secure over a very wide temperature range. Such adhesive formulations must be capable of being pre-applied to members to be joined, and should be non-tacky and non-blocking under ambient storage and use conditions, it being understood that in the context of this disclosure, the terms "ambient" and "room temperature" mean temperatures typically encountered in a workplace or other facility. Room temperature is typically understood to be in the general range of 10° C.–32° C., and more typically 17° C.–27° C. It is further desirable that such adhesive formulation be simple and easy to use, and it is most preferable that it be compatible with presently employed hot melt systems and techniques.

As will be explained hereinbelow, the present invention is directed to a two part hot melt adhesive composition which, upon application, undergoes a cross linking or other such curing step which further strengthens the adhesive bond. The adhesives of the present invention combine the qualities of hot melt adhesives and two component, curable adhesives.

The prior art has formulated various curable hot melt adhesive systems; but none are a two part system like that of the present invention, and none secure the benefits thereof. For example, U.S. Pat. Nos. 5,849,832 and 6,121,354 both show hot melt adhesive compositions which include a moisture activated curing adhesive component therein. These compositions are provided as a one component adhesive mixture, which is applied to surfaces at an elevated temperature and sets up to provide a thermoplastic bond. Contact with atmospheric moisture subsequently causes cross linking and curing of the adhesive which further strengthens the bond. Systems of this type would not be applicable for package sealing applications wherein the adhesive components are pre-applied, since the adhesive would then undergo further curing prior to the time that final bonding needs to be accomplished. Another approach is shown in U.S. Pat. No. 6,294,597 which discloses a hot melt adhesive which includes a thermally curing composition therein. The hot melt adhesive of this patent is applied at a first, relatively low temperature to form a thermoplastic bond, and this bond is subsequently exposed to higher temperature conditions to initiate a curing step. Adhesive materials of this type could be pre-applied; but the necessity of implementing a second, high temperature curing step precludes the efficient use of such compositions in a package sealing application.

As will be discussed further hereinbelow, the present invention provides a simple to use hot melt adhesive which forms a very strong bond which is stable at both high and low temperatures. The adhesive of the present invention can be used in presently employed package sealing technologies with minimal, if any, modification of equipment or processes.

BRIEF DESCRIPTIONS OF THE INVENTION

There is disclosed herein a two component, curable, hot melt adhesive system. The system includes a first hot melt adhesive formulation which has a softening temperature which is greater than room temperature. The first formulation is non-tacky and non-blocking at room temperature and it includes a first component of a curable adhesive therein. The adhesive system also includes a second hot melt adhesive formulation which has a softening temperature which is greater than room temperature. The second hot melt adhesive formulation is also non-tacky and non-blocking at room temperature. This second hot melt adhesive formulation includes a second component of a curable adhesive therein. The second component is reactive with the first component to provide a cured body of adhesive. The system is operable, when the first and second components are mixed at a temperature which is above their softening temperature, to form an initial hot melt adhesive bond which subsequently cures to produce a cured adhesive bond.

In specific embodiments, the components of the curable adhesive comprise approximately 2–10% by weight of the first and second hot melt formulations. In one embodiment of the invention, the curable adhesive is based upon an acrylic oligomer or polymer, which comprises one component of the curing adhesive. The other component comprises a curing agent which is reactive to cross link the acrylic oligomer or polymer. In another embodiment, the first component of the curable adhesive comprises an epoxy resin, and the second component comprises a curing agent for the epoxy resin. In a third embodiment, the first component of the curable adhesive comprises an isocyanate and the second component comprises a curing agent for the isocyanate.

DETAILED DESCRIPTION OF THE INVENTION

The present invention is directed to a hot melt adhesive composition which is curable to form a permanent, high and low temperature stable adhesive bond. The adhesive system of the present invention is a two part system comprised of two separate formulations, each of which is capable of functioning as a hot melt adhesive. Each formulation includes one component of a curable adhesive system therein. Each of the formulations comprising the adhesive system has a softening temperature which is in excess of room temperature. As used herein, "softening temperature" is understood to mean the temperature at which the composition begins to soften and/or become tacky as is determined by ASTM Ring and Ball Test (ASTM D36). The fact that the formulations have a softening temperature in excess of room temperature allows them to be pre-applied to articles to be subsequently joined. Since the applied formulations are non-tacky at room temperature, problems of blocking will not occur. Blocking is understood in the art to describe the tendency of tacky materials to pressure bond to one another or to other articles during handling and storage. The non-blocking nature of the formulations of the present invention means that coated articles can be stacked, rolled or otherwise processed without causing adhesion.

The fact that the formulations of the present invention are non-tacky and non-blocking at room temperature is very important with regard to their use as package sealants. The formulations of the present invention can be pre-coated onto package flaps or closures at the time that such packages are fabricated. This avoids the cost and complication of installing and maintaining adhesive dispensing equipment at each package filling and sealing facility. The adhesive formulations may be applied to mating surfaces of the package closure; as for example, on flaps or tabs which will contact one another when the package is sealed. Alternatively, the formulations may be applied to a single flap, closure, or tab member. In such instance, the two formulations will be applied to separate portions of the surface; as for example, the formulations may be applied in a pattern of alternating stripes, in a checkered pattern, or in any other suitable pattern.

In a package sealing application, packages having pre-applied adhesive are delivered to a package filling facility, typically in folded and/or stacked form. These packages are then filled and subsequently sealed by heating the pre-applied adhesive formulations to temperatures above their respective softening temperatures, and then closing the package so as to cause mixing of the two softened formulations. Heating of the adhesive formulations can be accomplished by direct application of heat, such as by a hot shoe; by radiant energy, such as a laser beam, a source of ultraviolet, microwave or infrared radiation or an electron beam; by a stream of heated gas; or by any other source of thermal energy. The bond is maintained in contact for a set time, until the hot melt components solidify sufficiently to form a thermoplastic bond. This blending of the two formulations causes the components of the curing adhesive component of the system to mix and begin curing. Within the context of this disclosure "curing" is used to refer to any reaction which increases the degree of polymerization of the curable adhesive material, and includes cross linking reactions as well as polymerization reactions. This curing reaction continues to take place even after the thermoplastic material has solidified. The curing reaction produces a temperature stable bond which does not soften and de-bond at elevated temperatures or fracture and de-bond at low temperatures.

In a typical adhesive system of the present invention, the two formulations are non-tacky, non-blocking, and storage stable under temperature conditions ranging from −10° C. to 60° C., and over a wide range of humidity and storage conditions. Adhesive formulations of the present invention generally have an open time ranging from 0.5 second to 15 seconds and a set time ranging from 0.2 second to 15 seconds. Typical softening temperatures range from 90° C. to 200° C. in most applications; however, the softening temperatures may be adjusted by varying the composition of the hot melt component of each formulation, as is known in the art. For most package sealing applications it has been found that film thicknesses in the range of 0.001 to 0.020 inch dry film thickness for each formulation suffice to provide a strong, reliable adhesive bond.

Each of the two formulations that comprise the adhesive system of the present invention are based upon hot melt adhesives, and in that regard there are a number of hot melt formulations which are available to one of skill in the art for this purpose. Hot melt adhesives are formulated from one or more of: thermoplastic resins, tackifier resins and waxes together with ancillary ingredients such antioxidants, coloring agents, viscosity control agents, wetting agents and the like. The components of the cross linkable adhesive will typically comprise 2–10% by weight of the hot melt formulation, although it is to be understood that for particular applications, higher concentrations or lower concentrations of the curable components may be employed.

The curable components of the adhesive system of this invention may comprise any two part curable adhesive which is compatible with the hot melt formulation and the end use of the adhesive system. One curable adhesive is based upon acrylic polymers and/or oligomers which comprise a first component, and a curing agent for these acrylic polymers and/or oligomers which function as a second component. Curing agents for these acrylic materials comprise amines, amides and peroxides, among others. Other curable adhesive systems may be based upon epoxy materials which can be cured with curing agents such as amines, amides, anhydrides, Lewis acids and the like. Yet another curable adhesive may be based upon urethane chemistry. In this regard, one component of the curable adhesive will be an isocyanate, which term includes blocked isocyanates.

Typical isocyanate curing materials include amines, amides and hydroxy terminated chemicals such as polyols, other alcohols, water and the like. Other variations of the two component curing adhesive will be apparent to those of skill in the art.

Some illustrative examples of compositions in accord with the present invention are as follows:

EXAMPLE 1

The first formulation of one embodiment of adhesive system of the present invention was prepared from the following materials, on a weight percentage basis:

| | |
|---|---|
| Ethylene-vinyl acetate (EVA) resin (Elvax ® 250, Du Pont Corporation) | 14.3% |
| Ethylene-vinyl acetate (EVA) resin (Elvax ® 260, Du Pont Corporation) | 4.7% |
| Terpene-phenolic tackifier (Sylvarez ® TP-2040, Arizona Chemical Company) | 65.2% |
| Polyethylene wax (Acumist ® B-12, Honeywell Corporation) | 9.5% |
| Antioxidant (Ethanox ® 310 pentaerythritol tetrakis (3-(3,5-di-t-butyl-4-hydroxyphenyl) propionate), Albemarle Corporation) | 1.5% |
| Acrylated urethane polyol (Ebecryl ® 1290, UCB Chemicals) | 4.8% |

In the foregoing mixture, the first five components, namely the EVA resins, the tackifier, the wax and the antioxidant, comprise a hot melt adhesive formulation. The acrylic material is a component of a curable adhesive. The resultant product is an off-white solid having a specific gravity of 1.01±0.05. Its softening point is 226±5° F., and its viscosity at 350° F. (Brookfield DVII+, spindle #27, 50 rpm) is 6000±500 cps.

The second formulation of this particular adhesive system is comprised of, on a weight basis:

| | |
|---|---|
| Amide resin (Unirez ® 2931, Arizona Chemical Company, polyamide resin) | 95.0% |
| Reactive polyamide resin (Versamid ® 100, Cognis Corporation) | 5.0% |

This second formulation comprises the other portion of the two part adhesive system. The polyamide resin functions as a hot melt adhesive, and the reactive amide is a curing agent for the acrylic material in the first formulation. This formulation is a light amber colored solid having a specific gravity of 0.95±0.04. Its softening point is 230±5° F., and its viscosity at 350° F. (Brookfield DVII+, spindle #27, 50 rpm) is 1850±200 cps.

Each of these formulations is non-tacky and non-blocking at room temperature. When heated above their softening temperatures and mixed, the reactive polyamide and the acrylic material begin a curing reaction whereby the acrylic material is converted into a cured adhesive material. Curing begins while the material is in the molten state and continues for some time after the compositions have returned to room temperature and the solid state. This material has been found to provide superior performance as a package sealing adhesive and provides a stable adhesive bond over a temperature range of greater than −30° F. to 250° F. For sake of comparison, conventional hot melt adhesives have an operational range which is no more than −20° F. to 160° F.

EXAMPLE 2

The first formulation of a second adhesive system in accord with the present invention was prepared as per that of Example 1 except that the acrylic resin component of the curable adhesive was substituted for by a mixture of two epoxy resins. Specifically, the first formulation included, by weight, 3.2% of a first epoxy resin Epon® 1001F which is a bisphenol A/epichlorohydrin based epoxy resin provided by Resolution Performance Products. An epoxy-terminated polyamide-epoxy adduct can also be used as a first epoxy resin to replace Epon 1001F or in combination therewith. The second epoxy resin is a phenol, 4,4'-(1-methylethylidene) bis-polymer with (chloromethyl) oxirane sold under the designation NPEL-128E by the Nan Ya Plastics Corporation of Taiwan. These two resins comprise the curable adhesive component of the formulation. This formulation is an off-white colored solid having a specific gravity of 1.00±0.02. Its softening point is 224±5° F., and its viscosity at 350° F. (Brookfield DVII+, spindle #27, 50 rpm) is 5500±500 cps.

The second formulation of this adhesive system is comprised of the aforementioned polyamide resin (Unirez® 2931) together with 5% of a reactive polyamide resin (Versamid® 125, Cognis Corporation).

This second formulation is a light amber colored solid having a specific gravity of 0.95±0.04. Its softening point is 230±5° F., and its viscosity at 350° F. (Brookfield DVII+, spindle #27, 50 rpm) is 1850±200 cps. This formulation also provided excellent results as a sealant material.

EXAMPLE 3

In this example, the first formulation included the two EVA resins, tackifier, wax and antioxidant of Example 1. The component of the cross linkable adhesive in this embodiment comprised an aliphatic diisocyanate, specifically 1,6-hexamethylene diisocyanate sold under the designation Desmodur H by the Bayer Corporation, and it was present at 5 weight percent of the formulation. This first formulation constituted an off-white solid having a specific gravity of 1.02±0.02. Its softening point was 226±5° F., and its viscosity at 350° F. (Brookfield DVII +, spindle #27, 50 rpm) was 5700±500 cps.

In this example, the second formulation was prepared as per the second formulation in Example 1, and in that regard, the reactive amide material functions as a curing agent for the isocyanate of the first formulation. This second formulation is a light amber solid having a specific gravity of 0.96±0.04. Its softening point is 230±5° F., and its viscosity at 350° F. (Brookfield DVII+, spindle #27, 50 rpm) is 1950±200 cps.

EXAMPLE 4

In this example, the first formulation was generally similar to the first formulation of Example 1, except that the amount of terpene phenolic tackifier was reduced from 65.2% to 63.2%, and the acrylic component of the curable adhesive was increased from 4.8% to 6.8%. This formulation was an off-white solid having a specific gravity of 1.01±0.05. Its softening point was 226±5° F., and its viscosity at 350° F. (Brookfield DVII+, spindle #27, 50 rpm) was 6000±500 cps.

The second formulation of this adhesive system was comprised, on a weight basis, of:

| | |
|---|---|
| Polyamide resin (Unirez ® 2620, Arizona Chemical Company) | 95.0% |
| Di-t-butyl peroxide | 5.0% |

This product is a light amber colored solid having a specific gravity of 0.94±0.05. Its softening point was 230±5° F., and its viscosity of 350° F. (Brookfield DVII+, spindle #27, 50 rpm) was 1950±200 cps.

All of the foregoing formulations provided excellent results as an adhesive material. The compositions, when heated and mixed, functioned as a high quality hot melt adhesive, and over a period of time developed a cured bond which was thermally stable. In addition, the adhesive bond is stable against detergents, oils, humidity and other such species which are likely to be encountered. This invention is applicable to a wide range of substrate surfaces usually encountered in the packaging industry, such as clay-coated cartons, polyolefin-coated and/or polyester-coated cases and cartons. All of these formulations have significant, utility in connection with package sealing operations.

Yet other formulations may be prepared in accord with the principles of the present invention. The portions of the various compositions set forth hereinabove may be varied depending upon the softening point, open time and other physical properties of the formulations. In general, a preferred group of materials for a hot melt base comprises 10–30% of the ethylene vinyl acetate copolymer, 40–80% of the terpene-phenolic tackifier resin, 3–15% of the wax and 2–10% of the component of the curable adhesive. In some instances the hot melt base composition will comprise a single material such as the polyamide resin described above. Other single materials such as polyethylenes, other polyolefins and the like may also be used as a hot melt. In some instances, the component of the curing adhesive may itself function as a hot melt adhesive, either alone, or with other materials.

In addition to the hot melt bases described hereinabove, there are numerous other hot melt compositions known and available to those of skill in the art, as are also numerous compositions of curable adhesives. In view of the teaching presented herein, one of skill in the art could readily formulate and use compositions in accord with the principles of the present invention. Also, while the adhesives of the present invention have been described with reference to their use as package sealing materials, the invention is not to be so limited. The adhesive materials of the present invention will also enjoy significant utility in connection with the fabrication of various other items of manufacture. For example, the adhesives may be employed to join window frames, vehicular body panels and other such constructions in the course of their manufacture.

In view of the foregoing, it is to be understood that the discussion, description and examples presented herein are illustrative of particular embodiments of the invention, but are not meant to be limitations upon the practice thereof. It is the following claims, including all equivalents, which define the scope of the invention.

What is claimed is:

1. A two component, curable, hot melt adhesive system comprising:
    a first hot melt adhesive formulation which has a softening temperature which is at least 100° C., said first hot melt adhesive formulation being non-tacky and non-blocking at room temperature, said first hot melt adhesive formulation including a first component of a curable adhesive therein; and
    a second hot melt adhesive formulation which has a softening temperature which is at least 100° C., said second hot melt adhesive formulation being non-tacky and non-blocking at room temperature, said second hot melt adhesive formulation including a second component of a curable adhesive therein, said second component being reactive with said first component to provide a cured adhesive;
    said system being operable, when said first formulation and said second formulation are mixed at a temperature which is above their respective softening temperatures, to form a hot melt adhesive bond which subsequently cures to produce a cured adhesive bond.

2. The adhesive system of claim 1, wherein at least one of said first and second hot melt adhesive formulations include: a thermoplastic polymeric resin; tackifier resin; and a wax.

3. The adhesive system of claim 2, wherein said theroplastic resin comprises an ethylene vinyl acetate copolymer.

4. The adhesive system of claim 2, wherein said tacifier comprises a terpene-phenolic resin.

5. The adhesive system of claim 2, wherein said wax comprises a polyethylene wax.

6. The adhesive system of claim 1, wherein at least one of said hot melt adhesive formulations includes a polyamide resin.

7. The adhesive system of claim 1, wherein said softening temperature is in the range of 100° C.–150° C.

8. The adhesive system of claim 1, wherein said first component of said curable adhesive comprises, on a weight basis, 2–10% of the first hot melt adhesive formulation; and said second component of said curable adhesive comprises, on a weight basis, 2–10% of said second hot melt adhesive formulation.

9. The adhesive system of claim 1, wherein said first component of said curable adhesive comprises an acrylic oligomer or polymer, and said second component of said curable adhesive comprises a curing agent which is reactive to cross link said acrylic oligomer or polymer.

10. The adhesive system of claim 9, wherein said curing agent is selected from the group consisting of: peroxides, amines, amides, and combinations thereof.

11. The adhesive system of claim 1, wherein said first component of said curable adhesive comprises an epoxy resin or an epoxy-terminated polyamide-epoxy adduct, and said second component of said curable adhesive comprises a curing agent for said epoxy resin.

12. The adhesive system of claim 11, wherein said curing agent is selected from the group consisting of: amines, amides, anhydrides, Lewis acids, and combinations thereof.

13. The adhesive system of claim 1, wherein said first component of said curable adhesive comprises an isocyanate, and said second component of said curable adhesive comprises a curing agent for said isocyanate.

14. The adhesive system of claim 13, wherein said isocyanate is a blocked isocyanate.

15. The adhesive system of claim 13, wherein said curing agent is selected from the group consisting of: amines, amides, hydroxyl terminated compounds, and combinations thereof.

16. The adhesive system of claim 1, wherein said first hot melt adhesive formulation comprises, on a weight basis:
    10–30% of an ethylene vinyl acetate copolymer;
    40–80% of a terpene-phenolic tackifier resin;

3–15% of a wax; and

2–10% of said first component of a curable adhesive.

17. The adhesive system of claim 16, wherein said first component is selected from the group consisting of: acrylic resins, epoxy resins, isocyanates, and combinations thereof.

18. The adhesive system of claim 1, wherein said second hot melt adhesive formulation comprises, on a weight basis:

90–98% of a polyamide resin; and

2–10% of said second component of a curable adhesive.

19. The adhesive composition of claim 18, where said second component of said curable adhesive is selected from the group consisting of: amines, amides, anhydrides, Lewis acids, peroxides, hydroxyl terminated compounds, and combinations thereof.

20. A two component, curable, hot melt adhesive system comprising:

a first hot melt adhesive formulation which has a softening temperature which is greater than room temperature, said first hot melt adhesive formulation being non tacky and non-blocking at room temperature, said first hot melt adhesive formulation including, on a weight basis, 2–10% of a first component of a curable adhesive therein; and a second hot melt adhesive formulation which has a softening temperature which is greater than room temperature, said second hot melt adhesive formulation being non-tacky and non-blocking at room temperature, said second hot melt adhesive formulation including, on a weight basis, 2–10% of a second component of a curable adhesive therein, said second component being reactive with said first component to provide a cured adhesive;

said system being operable, when said first formulation and said second formulation are mixed at a temperature which is above their respective softening temperatures, to form a hot melt adhesive bond which subsequently cures to produce a cured adhesive bond.

21. A two component, curable, hot melt adhesive system comprising:

a first hot melt adhesive formulation which has a softening temperature which is greater than room temperature, said first hot melt adhesive formulation being non-tacky and non-blocking at room temperature, said first hot melt adhesive formulation including a first component of a curable adhesive therein, said first component comprising an isocyanate; and a second hot melt adhesive formulation which has a softening temperature which is greater than room temperature, said second hot melt adhesive formulation being non-tacky and non-blocking at room temperature, said second hot melt adhesive formulation including a second component of a curable adhesive therein, said second component comprising a curing agent which is reactive with the isocyanate of said first formulation to provide a cured adhesive;

said system being operable, when said first formulation and said second formulation are mixed at a temperature which is above their respective softening temperatures, to form a hot melt adhesive bond which subsequently cures to produce a cured adhesive bond.

22. The adhesive system of claim 21, wherein said isocyanate is a blocked isocyanate.

23. The adhesive system of claim 21, wherein said curing agent is selected from the group consisting of: amines, amides, hydroxyl terminated compounds, and combinations thereof.

24. A two component, curable, hot melt adhesive system comprising:

a first hot melt adhesive formulation which has a softening temperature which is greater than room temperature, said first hot melt adhesive formulation being non-tacky and non-blocking at room temperature, said first hot melt adhesive formulation comprising on a weight basis:

10–30% of an ethylene vinyl acetate copolymer;

40–80% of a terpene-phenolic tackifier resin;

3–15% of a wax; and

2–10% of a first component of a curable adhesive; and a second hot melt adhesive formulation which has a softening temperature which is greater than room temperature, said second hot melt adhesive formulation being non-tacky and non-blocking at room temperature, said second hot melt adhesive formulation including a second component of a curable adhesive therein, said second component being reactive with said first component to provide a cured adhesive;

said system being operable, when said first component and said second component are mixed at a temperature which is above their respective softening temperatures, to form a hot melt adhesive bond which subsequently cures to produce a cured adhesive bond.

25. The adhesive system of claim 24, wherein said first component is selected from the group consisting of: acrylic resins, epoxy resins, isocyanates, and combinations thereof.

* * * * *